United States Patent [19]

Armijo et al.

[11] Patent Number: 4,802,587

[45] Date of Patent: Feb. 7, 1989

[54] DATA DISKETTE CARTRIDGE STORAGE TRAY WITH RESILIENT BUMPERS

[75] Inventors: Richard L. Armijo, 5511 Taft Ave., La Jolla, Calif. 92037; Paul R. Coughlin, 18975 Shadow Wood Dr., Monument, Colo. 80132

[73] Assignees: Richard L. Armijo, La Jolla, Calif.; Paul R. Coughlin, Madisonville, Ky.

[21] Appl. No.: 62,434

[22] Filed: Jun. 12, 1987

[51] Int. Cl.⁴ .............................................. B65D 85/57
[52] U.S. Cl. ...................... 206/444; 206/387; 211/40; 221/87; 312/15; 312/285; 312/319; 312/348
[58] Field of Search ............... 206/444, 387, 309, 454; 312/8–11, 15, 18, 12, 14, 319, 285, 348; 221/87; 211/40, 41

[56] References Cited

U.S. PATENT DOCUMENTS

| | | | |
|---|---|---|---|
| 3,603,478 | 9/1971 | Connan | 221/87 |
| 3,677,396 | 7/1972 | Staar | 221/87 X |
| 3,862,787 | 1/1975 | Hilsinger | 206/387 X |
| 4,257,524 | 3/1981 | Yonkers et al. | 312/15 X |
| 4,270,817 | 6/1981 | McRae | 312/15 |
| 4,581,670 | 4/1986 | Nemoto et al. | 206/444 X |

FOREIGN PATENT DOCUMENTS 0020372  2/1985  Japan ...................... 206/444

OTHER PUBLICATIONS

Information Disclosure Statement filed by Applicants, Oct. 2, 1987, including Innovative Technologies Brochure and a prior art "Disk Holder" drawing.

Primary Examiner—Stephen Marcus
Assistant Examiner—Bryon Gehman
Attorney, Agent, or Firm—Edward W. Callan

[57] ABSTRACT

The bumper includes resilient material for forcing a cartridge positioned at rest in contact with the bumper away from the bumper in response to the cartridge momentarily being forced into the bumpder from its at-rest position; and a rigid ridge extending from the back wall of the chamber; wherein the resilient material is secured to the ridge, and extended from the ridge to define a void between the ridge and the portion of the resilient material contacted by the cartridge.

2 Claims, 2 Drawing Sheets

DATA DISKETTE CARTRIDGE STORAGE TRAY WITH RESILIENT BUMPERS

BACKGROUND OF THE INVENTION

The present invention generally pertains to storage devices and is particularly directed to an improved tray for storing data diskette cartridges.

Data diskette cartridges are used for storing data for processing by data processing systems. The data is stored on a diskette; and the diskette is housed in a cartridge for protection of the diskette.

The storage tray of the present invention is directed to storage of data diskette cartridges of the type that are flat, made of rigid material, and includes a shutter which covers a portion of one edge of the diskette cartridge and which is spring-biased to cover an aperture in the cartridge that exposes the data diskette in the cartridge to a transducer when the cartridge is inserted into a data retrieval device to thereby move the shutter. Proper shutter operation is essential to protect the diskette when not in use and to expose the diskette when data is to be retrieved from the diskette. Thus, in storing the data diskette cartridge it is essential that the shutter not be damaged or displaced. If the shutter is damaged, weeks or months of valuable data stored on the diskette may be lost, or the disk drive may be damaged.

SUMMARY OF INVENTION

The present invention provides a tray for harmlessly storing data diskette cartridges, each of which cartridges is flat, made of rigid material, and includes a shutter which covers a portion of one edge of the diskette cartridge and which is spring-biased to cover an aperture in the cartridge that exposes a data diskette in the cartridge to a transducer when the cartridge is inserted into a data retrieval device to thereby move the shutter. The tray includes a chassis defining an open chamber having first and second opposed walls and slots in the first and second opposed walls for receiving opposite edges of individual diskette cartridges inserted into the chamber, and further defining a back wall at the opposite end of the chamber from the opening. The back wall includes a bumper positioned for contacting a portion of the partially shuttered edge of the data diskette cartridge not covered by the shutter when the shutter is in its spring-biased position and when the cartridge is inserted into the chamber with the shutter facing the back wall, to thereby prevent the shutter from contacting the back wall when it is inserted into the chamber. The bumper prevent the shutter from being damaged or loosened as a result of repeatedly making contact with the back wall of the chamber as the cartridge is repeatedly inserted into the chamber.

In one aspect of the tray of the present invention the bumper includes resilient material for forcing a cartridge positioned at rest in contact with the bumper away from the bumper in response to the cartridge momentarily being forced into the bumper from its at-rest position. The resilient material is secured to the ridge, and extends from the ridge to define a void between the ridge and the portion of the resilient material contacted by the cartridge. The resiliency of the bumper material is sufficient to force a cartridge forced away from the bumper in response to being momentarily forced against the bumper to move such a distance from the bumper that the edge of the cartridge extending from the opening of the chamber extends far enough beyond the corresponding edge of each of a pair of cartridges in said at-rest position in slots adjacent to the extended cartridge as to enable the extended edge of the extended cartridge to be readily gripped by one's fingers at any position along the extended edge. This feature makes it easier to remove a cartridge from the tray.

Additional features of the present invention are described in relation to the description of the preferred embodiment.

DESCRIPTION OF THE PREFERRED EMBODIMENT

Figure 1:
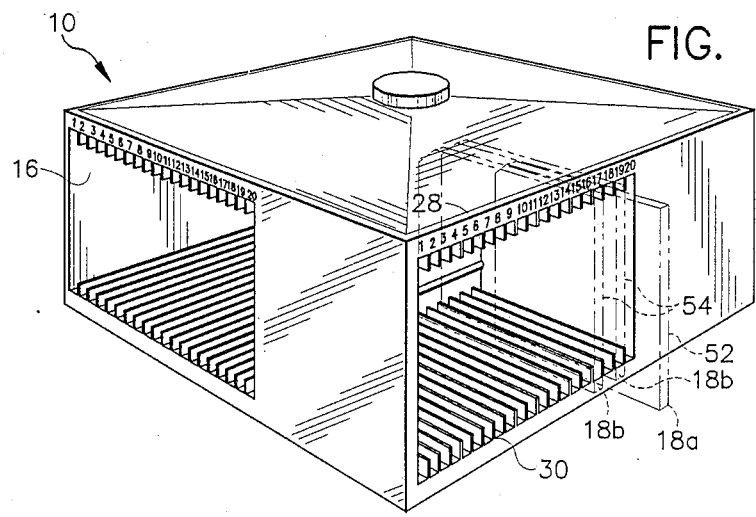
FIG. 1 is a perspective view of a preferred embodiment of the tray of the present invention, with diskette cartridges stored in the tray being shown by shadow lines.
Figure 2:
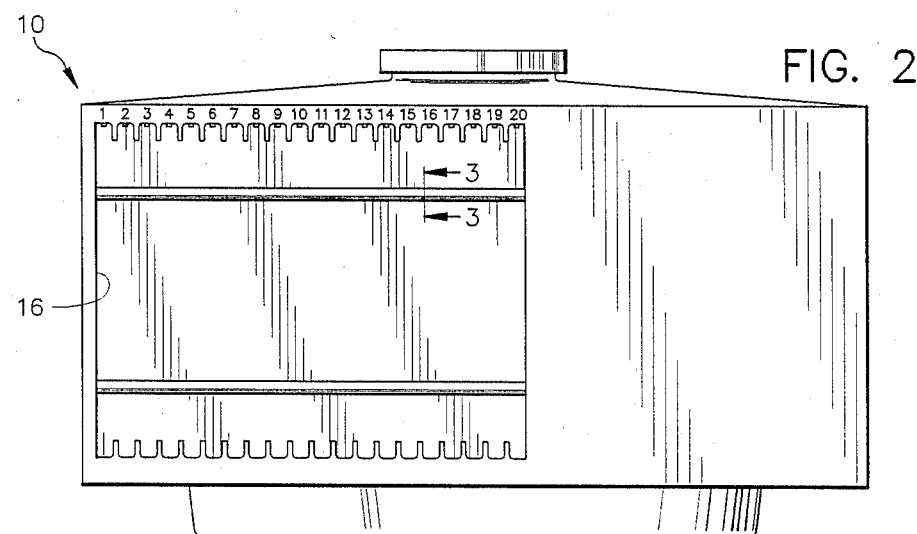
FIG. 2 is a side plan view of the tray of FIG. 1.

Referring to the Drawing, the preferred embodiment of the tray of the present invention includes a chassis 10 mounted on a carousel base 12 for 360 degree rotation about an axis 14 defined by the carousel base 12. The chassis 10 defines four diagonally disposed open chambers 16, that are symmetrically disposed about the axis 14. Each chamber 16 is designed to receive a plurality of data diskette cartridges 18 of the type that are flat, made of a rigid material and include a shutter 20.

Figure 7:
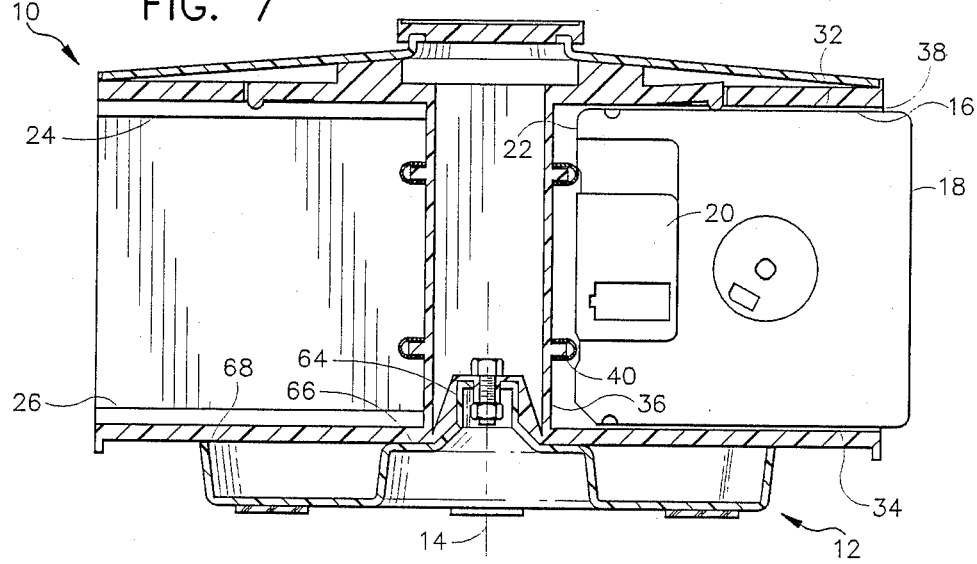
FIG. 7 is a side sectional view of the tray of FIG. 1, as viewed along line 7—7 in FIG. 4, and showing a data diskette cartridge inserted in the tray in an at-rest position.

Referring to FIG. 7, the shutter 20 covers a portion of one edge 22 of the cartridge 18.

Each open chamber 16 has top and bottom opposed walls 24, 26 and slots 28, 30 in the top and bottom opposed walls for receiving opposite edges 32, 34 of individual diskette cartridges 18 inserted into the chamber 16. Each chamber 16 further defines a back wall 36 at the opposite end of the chamber from the chamber opening 38.

The back wall 36 includes a pair of bumpers 40 for contacting the portions of the partially shuttered edge 22 of the data diskette cartridge 18 not covered by the shutter 20 when the shutter 20 is in its spring-biased position and when the cartridge 18 is inserted into the chamber 16 with the shutter 20 facing the back wall 36, to thereby prevent the shutter 20 from contacting the back wall 36 when it is inserted into the chamber 16.

Figure 3:
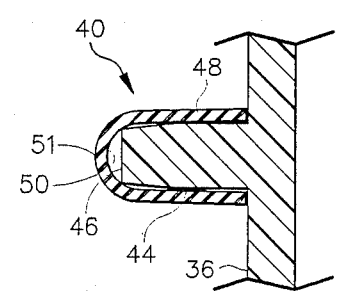
FIG. 3 is a sectional view of a bumper in the tray of FIGS. 1 and 2, as viewed along line 3—3 in FIG. 2.
Figure 4:
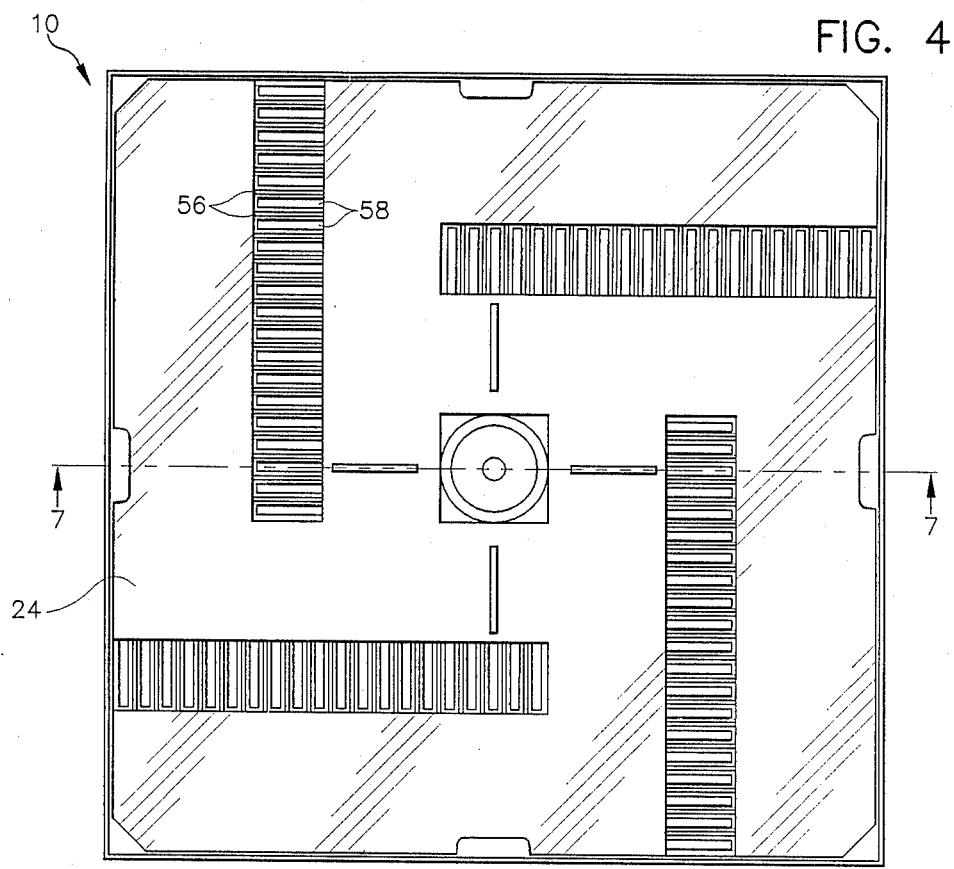
FIG. 4 is a top plan view of the top wall of the tray of FIG. 1, as seen with the cover removed.

Referring to FIG. 3, each bumper 40 includes a rigid ridge 42 extending from the back wall 36 of the chamber 16. The ridge 42 has extending sides 44 and an extended edge 46. The bumper 40 further includes resilient material 48, such as rubber, secured to the extending sides 44 of the ridge 22, and extended from the extending edge 46 of the ridge 42 to define a void 50 between the ridge 42 and the portion 51 of the resilient material 48 contacted by the cartridge 18. (See FIGS. 3 and 7). The void enhances the resiliency of the bumper 40.

The resilient bumper material 48 forces a cartridge 18 positioned at rest in contact with the bumper 40 (as shown in FIG. 7) away from the bumper 40 in response to the cartridge 18 momentarily being forced into the bumper 40 from its at-rest position.

The resiliency of the resilient bumper material 48 is sufficient to force a cartridge 18 forced away from the bumper 40 in response to being momentarily forced against the bumper 40 to move such a distance from the bumper 40 that the edge 52 of the cartridge 18a extending from the opening of the chamber 16 (FIG. 1) extends far enough beyond the corresponding edge 54 of each of a pair of cartridges 18b in the at-rest position in slots 28, 30 adjacent to the extended cartridge 18a as to enable the extended edge 52 of the extended cartridge 18a to be readily gripped by one's fingers at any position along the extended edge 52.

Figure 6:
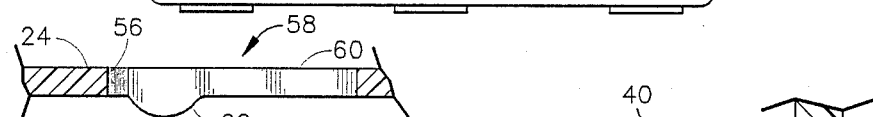
FIG. 6 is a side view of the spring of FIG. 5, as viewed along line 6—6 in FIG. 5.
Figure 5:
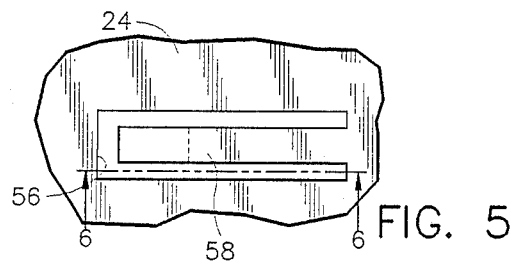
FIG. 5 is an enlarged view of a spring in the top wall of the tray of FIG. 1, as seen with the cover removed.

The top wall 24 of the chassis 10, which defines the slots 28 in the top of the chamber 16, contains apertures 56 that further define a spring 58 in each slot 28 for contacting the received edge 32 of a data diskette cartridge 18 in the at-rest position in the chamber 16 to apply sufficient pressure on the opposite received edges 32, 34 of the cartridge 18 to retain the cartridge 18 in the chamber 16 in opposition to the force of gravity when the chamber opening 38 faces downward. Referring to FIG. 5 and 6, the spring 58 is defined by a cantilevered arm 60 having a rounded tip 62 extending into the slot 28. The tip 62 contacts an inserted cartridge 18 and the spring 58 is depressed (as shown in FIG. 7) to apply pressure against the edge 32 of an inserted cartridge 18.

The resiliency of the bumper material 48 is less than that required to force a cartridge 18, which is forced away from the bumper 40 in response to being momentarily forced against the bumper 40, to move such a distance from the bumper 40 as to lose contact with the spring 58 and thereby fall from the chamber 16 in response to the force of gravity when the chamber 16 faces downward.

Referring to FIG. 7, the carousel base 12 includes an axel 64, upon which the chassis 10 is mounted for rotation. The chassis 10 is supported by circular base surface 66 and the base's circular edge 68, which are positioned to prevent the chassis from tipping over when one chamber 16 is filled with diskette cartridges 18 and its diagonally disposed chamber 16 is empty.

We claim:

1. A tray for storing data diskette cartridges, each of which cartridges is flat, made of rigid material, and includes a shutter which covers a portion of one edge of the diskette cartridge, with the shutter being spring-biased to cover an aperture in the cartridge that exposes a data diskette in the cartridge to a transducer when the cartridge is inserted into a data retrieval device to thereby move the shutter, said tray comprising a chassis defining an open chamber having first and second opposed walls and slots in the first and second opposed walls for receiving opposite edges of individual diskette cartridges inserted into the chamber, and further defining a back wall at the opposite end of the chamber from the opening;

wherein the back wall includes a bumper positioned for contacting a portion of the partially shuttered edge of the data diskette cartridge not covered by the shutter when the shutter is in its spring-biased position and when the cartridge is inserted into the chamber with the shutter facing the back wall, to thereby prevent the shutter from contacting the back wall when it is inserted into the chamber;

wherein the bumper comprises resilient material for forcing a said cartridge positioned at rest in contact with the bumper away from the bumper in response to the cartridge momentarily being forced into the bumper from its at-rest position; and a rigid ridge extending from the back wall of the chamber;

wherein said resilient material is secured to the ridge, and extended from the ridge to define a void between the ridge and the portion of the resilient material contacted by the cartridge.

2. A tray according to claim 1, including at least two said bumpers.

* * * * *